United States Patent [19]
Bier et al.

[11] 4,111,921
[45] Sep. 5, 1978

[54] TRANSPARENT POLYAMIDES

[75] Inventors: Gerhard Bier, Troisdorf; Franz Blaschke, Witten, Ruhr; Helmut aus der Fünten, Niederkassel-Mondorf; Gerhard Schade, Witten-Bommern, all of Fed. Rep. of Germany

[73] Assignee: Dynamit Nobel Aktiengesellschaft, Troisdorf, Fed. Rep. of Germany

[21] Appl. No.: 725,304

[22] Filed: Sep. 21, 1976

[30] Foreign Application Priority Data

Sep. 26, 1975 [DE] Fed. Rep. of Germany ....... 2542938

[51] Int. Cl.² .............................................. C08G 69/26
[52] U.S. Cl. ................................. 528/338; 260/30.8 R; 260/33.4 R; 528/339; 528/340
[58] Field of Search ....................................... 260/78 R

[56] References Cited

U.S. PATENT DOCUMENTS

| | | | |
|---|---|---|---|
| 3,516,972 | 6/1970 | Wolfes et al. | 260/78 R |
| 3,563,959 | 2/1971 | Schade et al. | 260/78 R |

*Primary Examiner*—Harold D. Anderson
*Attorney, Agent, or Firm*—Burgess, Dinklage & Sprung

[57] ABSTRACT

A polyamide composition, useful in the preparation of transparent sheets, having improved resistivity toward solvents containing moieties of terephthalic acid and 2-methylpentamethylenediamine, said polyamide characterized by a content of moieties of 2-ethyltetramethyldiamine and/or of isophthalic acid in a concentration totalling 15 to 30 mole percent, with respect to the sum of all diamine moieties or all dicarboxylic acid moieties, as the case may be.

9 Claims, No Drawings

TRANSPARENT POLYAMIDES

BACKGROUND OF THE INVENTION

1. Field of the Invention

This invention relates to polyamide compositions especially for use in preparing sheets, films and the like. More especially, this invention relates to polyamide compositions which form transparent sheets, which polyamide compositions have improved resistance to the action of organic solvents such as alcohols. More especially, this invention relates to polyamide compositions based on terephthalic acid moieties and 2-methylpentamethylenediamine, the polyamides being characterized by a content of moieties of 2-ethyltetramethylenediamine and/or of isophthalic acid in a concentration totalling 15 to 30 mole percent, with respect to the sum of all diamine moieties or all dicarboxylic acid moieties. This invention also relates to transparent sheets of such polyamides and methods for preparing such polyamides.

DISCUSSION OF THE PRIOR ART

Transparent polyamides prepared from aromatic dicarboxylic acids, especially terephthalic acid, and alkyl-substituted α,ω-diamines, which are suitable for the manufacture of products made by injection molding, extrusion or other such processes, have been described many times. See, for example, U.S. Pat. No. 3,150,117, German "Offenlegungsschrift", No. 1,495,393, and German Pat. No. 1,947,217. Especially the poly-(trimethylhexamethyleneterephthalic amides) prepared in accordance with the two last-named processes have achieved industrial importance in recent years on the basis of their outstanding characteristics.

One disadvantage of such polyamides is that they are relatively sensitive to the action of organic solvents such as alcohols. However, their applications are limited not merely by this characteristic. They are limited also by the fact that the raw materials from which they are made, especially the diamines, are comparatively expensive.

Accordingly, it is an object of this invention to provide a polyamide which can be formed into a transparent sheet which has improved resistance to the action of solvents such as alcohols. Moreover, it is a further object of this invention to provide such polyamides which can be synthesized from raw materials which are readily available at relative inexpense. It is a further object of the invention to provide such polyamides which are transparent and have a glass transition temperature of at least 100° C. It is a further object of this invention to provide polyamides of the type described which are linear and amorphous.

SUMMARY OF THE INVENTION

Broadly, this invention comtemplates a polyamide composition which can be formed into transparent products, said polyamide composition containing moieties of terephthalic acid and of 2-methylpentamethylenediamine, said polyamide having a content of moieties of 2-ethyltetramethyldiamine and/or of isophthalic acid in a concentration totalling 15 to 30 mole percent, with respect to the sum of all diamine moieties or all dicarboxylic acid moieties.

In accordance with the present invention, it has been discovered that linear polyamides having a glass transition temperature above 100° C can be prepared by co-polymerizing a terephthalic acid supplying moiety and 2-methylpentamethylenediamine in the presence of either 2-ethyltetramethylenediamine or an isophthalic acid supplying moiety or a mixture thereof. Polyamides prepared having a content of 2-ethyltetramethylenediamine and/or of isophthalic acid moiety totalling 15 to 30 mole percent, with respect to the sum of all diamine moieties or all dicarboxylic acid moieties have improved resistance to the action of organic solvents, especially alcohols. These polyamides are linear and have good mechanical properties. They can readily be formed by conventional processes into transparent objects, particularly sheets and films.

Accordingly, the present invention is specifically directed to such polyamides containing moieties of terephthalic acid and of 2-methylpentamethylenediamine having a content of 2-ethyltetramethylenediamine or isophthalic acid in a combined concentration totalling 15 to 30 mole percent, with respect to the sum of all diamine moieties or all dicarboxylic acid moieties. Preferably, the polyamides of the invention contain moieties of both 2-ethyltetramethylenediamine and isophthalic acid.

The polyamides of the invention can have a molecular weight within a wide range. Generally, the molecular weight is within the range of between 15,000 and 40,000, preferably between 20,000 and 30,000. These molecular weight values are determined in accordance with the procedure of osmotic pressure measurement as described, for instance, in: R. Hill, Fibres from Synthetic Polymers, Elsevier Publishing Company, Amsterdam 1953, pages 202–205. When formed into specimens, the specimens can have any thickness ranging from between 0.1 to 10mm. Within this range these specimens have the transparency discussed above. Optimal transparency is obtained when the sheets have a thickness between 0.1 and 3mm.

The diamine component of the new polyamide can be prepared by transforming appropriate dinitriles, such as the ones obtainable by the process described in German Pat. No. 1,618,797, into the corresponding diamines, namely 2-methylpentamethylenediamine and 2-ethyltetramethylenediamine, respectively, by conventional hydrogenation methods. These two diamines will be referred to hereinafter as diamine 51 (2-methylpentamethylenediamine) and diamine 42 (2-ethyltetramethylenediamine). 2-Methylpentamethylene diamine can be prepared by hydrogenating 2-methyleneglutaric acid dinitrile, a dimerization product of acrylonitrile, by known methods.

The transparent polyamides of the invention preferably contain, in addition to the moieties of terephthalic acid and diamine 51, moieties of diamine 42 in a concentration of 4 to 6 mole-%, and of isophthalic acid in a concentration of 11 to 20 mole-% with respect to the sum of all diamines or of all dicarboxylic acid moieties.

Diamine 51 is known as a diamine component for the preparation of polyamides on the basis of Japanese Patent 19 551/69. Terephthalic acid is used as the acid component. These polyamides crystallize, however, and therefore they appear opaque in the solid state, not transparent. They are not usable, therefore, for the manufacture of products, such as injection molded products, of lasting transparency.

Setting out from this state of the art to achieve transparency of polyamides made from diamine 51, it has been proposed in German "Offenlegungsschrift" 2,060,701 that preferably 40 to 60 mole-% of the diamine 51 be replaced by 1,3-bis-(aminomethyl)-cyclohexane, mixed in some cases with the 1,4 isomer. Such polyamides, however, are very sensitive to the action of organic solvents such as alcohols, for example. This weakness greatly limits the usefulness of products made from them.

It has been found that glass-clear, amorphous polyamides can be obtained which have glass temperatures above 100° C, and which also have a far better resistance to alcohols, by using as the principal component, in accordance with the invention, terephthalic acid on the one hand and 2-methylpentamethylenediamine on the other, and using as the secondary component either isophthalic acid in amounts of 15 to 30 mole-% of the dicarboxylic acids, or 2-ethyltetramethylenediamine in amounts of 15 to 30 mole-% of the diamine mixture, or by using both isophthalic acid and 2-ethyltetramethylenediamine, both together amounting to 15 to 30 mole-%. On the dicarboxylic acid side 100 mole-% is used, and 100 mole-% is used on the diamine side.

It is preferred that the polyamides of the invention contain 15 to 30 mole percent of moieties of 2-ethyltetramethylenediamine or moieties of isophthalic acid, based upon the combined amounts of all diamine moieties or all dicarboxylic acid moieties.

It is surprising that polyamides of the composition of the invention lose their resistance to solvents immediately, as soon as the sum of diamine 42 and isophthaloyl moieties in the polyamide exceeds the limit of 30 mole-%, while the resistance to solvents remains virtually unaltered up to this limit.

The polyamides of the composition of the invention are prepared by heating the approximately equivalent mixtures of dicarboxylic acid and diamine or of the corresponding salts, preferably in the presence of water, at temperatures of 200° to 270° C, in autoclaves, followed by gradual expansion to normal pressure and condensation at normal pressure or in vacuo at temperatures of about 260° to 300° C, preferably around 280° C. In order to compensate for diamine losses, which are not negligible small, especially in the case of diamine 42, it is desirable to use a diamine excess of 2 to 5% of the theory.

If dimethylterephthalate is used instead of free terephthalic acid, it is desirable to proceed in accordance with the teaching of U.S. Pat. No. 3,454,536.

Lastly, on account of the relatively high melt viscosity of the polyamides formed by condensation, which makes it difficult to remove the melt from the autoclave, to effect the final stage of the condensation in evacuable dual screw extruding machines, the preliminary condensation can then also be performed continuously, or it can be performed batch-wise in the autoclave, after which the extruding machine is preferably charged through a buffer vessel maintained at 220° to 250° C; the preliminary condensation melt is sufficiently stable in storage under these conditions.

Other known measures, such as the use of chain interrupters to stabilize the molecular weight, the addition of polycondensation catalysts, light and heat stabilizers, lubricants, mold releasing agents, fillers, pigments, etc., provided they do not decompose, vaporize or cause undesired secondary reactions under the conditions of the reaction, can also be used in those stages of the manufacturing process in which they are desirable. It is also possible, of course, to incorporate these and other known additives into the condensed polyamides by co-extrusion.

The polyamides of the invention have glass transformation points around 137° to 142° C and they are elastic, having an modulus of elasticity of between 25 and 35 N/mm². In their physical characteristics they are not very much different from the commercially used poly-(2,2,4-[2,4,4]-trimethylhexamethyleneterephthalamide), as will be shown below. Their main advantage with respect to the latter polyamide lies in their good resistance to solvents (cf. Comparative Test 2) and in the easy accessability of the diamine component plus the higher concentration by weight of terephthaloyl is isophthaloyl radicals, which tend to reduce costs.

*N/mm² concerns the new SI units Newton by square millimeters. If one multiplies this Si unit with the factor 10.2 there is provided the corresponding kp/cm² (kilopond per square centimeter) unit.

On the basis of their good mechanical characteristics and their good resistance to solvents, especially alcohols, the polyamides of the invention can be used for a broader range of applications than the other polyamides mentioned above. On account of their amorphous character, the polyamides of the invention can be made into products of permanent transparency by injection molding, extrusion and other such processes.

In order to more fully illustrate the nature of the invention and the manner of practicing the same, the following Examples are presented.

EXAMPLES

EXAMPLE 1

The following were weighed into a 250 ml round flask provided with stirrer, nitrogen supply tube and descending condenser:

34.92 g of dimethylterephthalate (0.18 mole)
3.32 g of isophthalic acid (0.02 mole)
23.9 g of diamine 51 (diamine 42 content 5%) (0.206 mole)
15 g of water
60 g of phosphorous acid.

This reaction mixture was stirred for 6 hours at 90°-100° C after the air had been displaced by nitrogen. Then the temperature was continuously increased to 280° C over a period of 4 hours while the methanol-water mixture was removed by distillation, and the reaction mixture was maintained at this temperature under normal pressure for another 5 hours. After cooling, a colorless, tough, hard and transparent solid body was obtained whose relative viscosity, measured in concentrated sulfuric acid at 25° C at a concentration of one gram of polymer in 100 ml of solution, had reached a value of 2.78. The glass transition temperature of the polymer was determined by differential thermoanalysis to be 142° C.

EXAMPLE 2

Example 1 was modified by using, instead of 34.92 g of dimethylterephthalate, the amount equivalent thereto of 29.88 g of terephthalic acid, and the water added was evaporated out immediately as soon as homogeneous salt solution had formed. The polycondensate achieved a relative viscosity of 2.65 and was also transparent.

EXAMPLE 3

Example 1 was repeated in a 40-liter autoclave, using 200 times the amount of starting materials specified in Example 1. The batch was polycondensed at 280° C until the current drain of the stirrer motor began to fluctuate irregularly at 5 rpm, indicating that the melt was no longer wetting the wall of the reactor completely but was being pulled away from the wall from time to time. The melt was then forced from the reactor through a bottom cock by compressed nitrogen, and was granulated and dried at 130° C for 12 hours at 0.5 to 1 Torr. The relative viscosity amounted to 2.70.

After the injection molding or pressing of the dried granular product to form standard test specimens, the following application characteristics were determined. Between parentheses are given the corresponding characteristics of poly-(2,2,4-[2,4,4]-trimethylhexamethyleneterephthalamide, relative viscosity 2.6:

| | |
|---|---|
| Stretch tension in N/mm² per DIN 53 455 | 93 (85) |
| Tensile strength in N/mm² per DIN 53 455 | 59 (60) |
| Elongation at rupture in % per DIN 53 455 | 84 (70) |
| Modulus of elasticity (pull test) in N/mm² per DIN 53 457 | 30 (29) |
| Impact toughness per DIN 53 453 | unbroken (unbroken) |
| Notch impact toughness after 4 days at 23° C, 50% atmospheric humidity, in kJ/m²* per DIN 53 453 | 12 (10–15) |
| Thermal stability of shape per ISO-R 75 in ° C per DIN 53 461 | |
| Method A | 125 (130) |
| Method B | 136 (140) |
| Work shrinkage in % per DIN 16 901 | 0.4 (0.5) |
| Glass transition temperature based on torsional vibration measurement after 28 days soaking in water, in ° C per DIN 53,445 | 90 (92) |

*kJ/m² also concerns a new SI unit. If one multiplies the values for kJ/m² with the factor 1.02 one obtains the corresponding kilopond centimeter per square centimeter unit (kp cm/cm².
DIN means Deutsche Industrie Norm.

*kJ/m² also concerns a new SI unit. If one multiplies the values for kJ/m² with the factor 1.02 one obtains the corresponding kilopond centimeter per square centimeter unit (kp cm/cm².

DIN means Deutsche Industrie Norm.

EXAMPLES 4 – 11

Example 1 was repeated using various molar ratios of the starting substances. Examples 1 to 3 are included in the following table:

| No. | DMT | IPS | 51 | 42 | $\eta_{rel}$ | $T_g$ | Transparency | Affected by ethanol |
|---|---|---|---|---|---|---|---|---|
| 1 | 90 | 10 | 95 | 5 | 2.78 | 142 | + | − |
| 2 | 90 | 10 | 95 | 5 | 2.65 | 140 | + | − |
| 3 | 90 | 10 | 95 | 5 | 2.70 | 142 | + | − |
| 4 | 80 | 20 | 95 | 5 | 2.71 | 140 | + | − |
| 5 | 70 | 30 | 95 | 5 | 2.75 | 137 | + | + |
| 6 | 100 | — | 75 | 25 | 2.68 | 138 | + | − |
| 7 | 100 | — | 90 | 10 | 2.70 | 140 | − | − |
| 8 | 75 | 25 | 95 | 5 | 2.67 | 140 | + | − |
| 9 | 95 | 5 | 95 | 5 | 2.70 | 140 | − | − |
| 10 | 95 | 5 | 70 | 30 | 2.66 | 138 | + | + |
| 11 | — | 100 | 95 | 5 | 2.65 | 137 | + | + |

In the above table, DMT and IPS figures represent the molar percentage of dimethylterephthalate and isophthalic acid, respectively; 51 and 42 figures indicate the molar percentage of 2-methylpentamethylenediamine (=51) and 2-ethyltetramethylenediamine (=42), respectively. $T_g$ represents the glass transition temperature determined by differential thermoanalysis. Transparency was judged by visual inspection of the solidified melt, + representing clear transparency and - representing opacity. The column headed "affected by ethanol" indicates the relative loss of tensile strength in cast films 0.1 mm thick (made with N-methylpyrrolidone) after 7 days of immersion in ethanol. The minus sign indicates a loss of 0 to 20%, and the plus sign the loss of 20 to 100% or deformation, clouding, etc.

Examples 4, 6 and 8 show that transparency combined with insensitivity to alcohol can be achieved only when the sum of the isophthalic acid and diamine 42 moieties does not exceed 25 to 30 mole-%, it being immaterial, within the accuracy of the experiment, how this total is composed. Examples 1, 3, 7 and 9 show that the transparency limit is to be found where the minimum sum of the isophthalic acid radicals and diamine 42 radicals is above 10 mole-%, i.e., at, say, 15 mole-%. Examples 5 and 10 show that percentage contents of isophthalic acid and diamine 42 totaling 35 mole-% make the polyamide products sensitive to ethanol, regardless of how this percentage is composed.

It is remarkable that the alcohol sensitivity at the determined composition limit increases abruptly to such an extent that, in the case of the films marked +, it was not possible to measure the percentage of loss, for either they had completely disintegrated, or at least they could not be removed from the containers without destroying them.

It is furthermore apparent from Examples 4 to 11 that the glass transition temperatures in the polyamides are virtually constant regardless of the ratio of the terephthalic acid radicals to the isophthalic acid radicals and regardless of the ratio of the two diamine radicals.

Comparative Example 1

Example 2 of German "Offenlegungsschrift" 2,060,701 was repeated, since it did not involve the use of isophthalic acid, whereas it had been found that excessively high concentrations of isophthalic acid produce ethanol sensitivity even in the polyamides of the invention.

After cast films made from this polyamide had been immersed for 7 days in methanol, ethanol and isopropanol, respectively, the films thus treated could easily be rubbed apart between the fingertips, while a film cast from the polyamide of Example 1 of this invention had not altered measurably after the same treatment in the said liquids.

Comparative Example 2

A 0.1 mm thick film of poly-(2,2,4-[2,4,4]-trimethylhexamethyleneterephthalamide), relative viscosity 2.6, was immersed in ethanol. When left in the ethanol overnight at room temperature, it dissolved completely.

What is claimed is:
1. A film forming polyamide composition consisting essentially of the polymeric condensation product of (1) terephthalic acid, (2) 2-methylpentamethylenediamine and at least one of (3) 2-ethyltetramethylenediamine or (4) isophthalic acid or (5) a mixture of 2-ethyltetramethylenediamine and isophthalic acid, the concentration of said (3) 2-ethyltetramethylenediamine or (4) isophthalic acid or (5) mixture totalling 15 to 30 mole percent, with respect to the sum of all diamine or dicarboxylic acid.

2. A composition according to claim 1 produced from 15 to 30 mole percent of 2-ethyltetramethylenediamine, based upon the sum of all diamine.

3. A polyamide according to claim 1 produced containing from 15 to 30 mole percent of isophthalic acid with respect to the sum of all dicarboxylic acid.

4. A polyamide composition according to claim 1 produced from 2-ethyltetramethylenediamine in a concentration of 4 to 6 mole percent and isophthalic acid in a concentration of 11 to 26 mole percent, with respect to the sum of all diamine or all dicarboxylic acid.

5. A polyamide composition according to claim 1 having a glass transition temperature of at least 100° C.

6. A polyamide composition according to claim 4 which is insoluble in ethyl alcohol.

7. A transparent polyamide sheet of the composition of claim 1.

8. A transparent polyamide sheet of the composition of claim 2.

9. A transparent polyamide sheet of the composition of claim 4.

* * * * *